United States Patent
Mulcahy et al.

(10) Patent No.: US 8,458,450 B2
(45) Date of Patent: Jun. 4, 2013

(54) CONFIGURING A COMPUTING MACHINE TO USE A COMPONENT DRIVER TO DIRECTLY CONTROL AT LEAST ONE OF INITIALIZED HARDWARE COMPONENTS OF ANOTHER COMPUTING MACHINE

(75) Inventors: Luke Mulcahy, Houston, TX (US); Paul J. Broyles, III, Cypress, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 420 days.

(21) Appl. No.: 12/836,351

(22) Filed: Jul. 14, 2010

(65) Prior Publication Data
US 2012/0017024 A1 Jan. 19, 2012

(51) Int. Cl.
G06F 15/177 (2006.01)
G06F 9/00 (2006.01)
G06F 3/00 (2006.01)

(52) U.S. Cl.
USPC .......................................... 713/2; 713/1; 710/8

(58) Field of Classification Search
USPC ........................................................ 713/1, 2
See application file for complete search history.

(56) References Cited

U.S. PATENT DOCUMENTS

| | | | |
|---|---|---|---|
| 5,157,769 A * | 10/1992 | Eppley et al. | 709/253 |
| 5,504,864 A * | 4/1996 | Berg | 709/253 |
| 6,473,789 B1 | 10/2002 | Chen et al. | |
| 6,704,824 B1 * | 3/2004 | Goodman | 710/300 |
| 6,804,727 B1 * | 10/2004 | Rademacher | 710/9 |
| 7,266,774 B2 | 9/2007 | Jones | |
| 7,331,051 B2 * | 2/2008 | Wong et al. | 719/327 |
| 7,409,561 B1 * | 8/2008 | Kolli et al. | 713/193 |
| 8,041,863 B2 * | 10/2011 | Kwan et al. | 710/72 |
| 2002/0091877 A1 * | 7/2002 | Karidis | 710/1 |
| 2004/0019724 A1 * | 1/2004 | Singleton et al. | 710/303 |
| 2007/0260763 A1 * | 11/2007 | Kasama | 710/8 |

* cited by examiner

*Primary Examiner* — Suresh Suryawanshi
(74) *Attorney, Agent, or Firm* — Chun-Liang Kuo (57) ABSTRACT

A method including initializing at least one component of another computing machine in response to the other computing machine coupling to a computing machine, loading a component driver onto the computing machine for at least one of the initialized components, and configuring the computing machine to use the component driver to control at least one of the initialized components of the other computing machine.

20 Claims, 7 Drawing Sheets

CONFIGURING A COMPUTING MACHINE TO USE A COMPONENT DRIVER TO DIRECTLY CONTROL AT LEAST ONE OF INITIALIZED HARDWARE COMPONENTS OF ANOTHER COMPUTING MACHINE

BACKGROUND

When utilizing a computing machine or components of the computing machine, a user can access the computing machine and proceed to load an operating system of the computing machine. Once the operating system is loaded onto the computing machine, the user can proceed to access one or more input devices of the computing machine to configure one or more of the components for use. In response to configuring the components, the user can proceed to utilize the computing machine and one or more components on the computing machine.

BRIEF DESCRIPTION OF THE DRAWINGS

Various features and advantages of the disclosed embodiments will be apparent from the detailed description which follows, taken in conjunction with the accompanying drawings, which together illustrate, by way of example, features of the disclosed embodiments.

DETAILED DESCRIPTION

By initializing at least one component of another computing machine in response to the other computing machine coupling to a computing machine, a component driver for an initialized component of the other computing machine can be loaded onto the computing machine. Additionally, by configuring the computing machine to utilize the component driver to control at least one of the initialized components, the initialized components of the other computing machine can be configured for use on the computing machine. As a result, an economic and user friendly experience can be created for a user when utilizing the computing machine.

Figure 1:
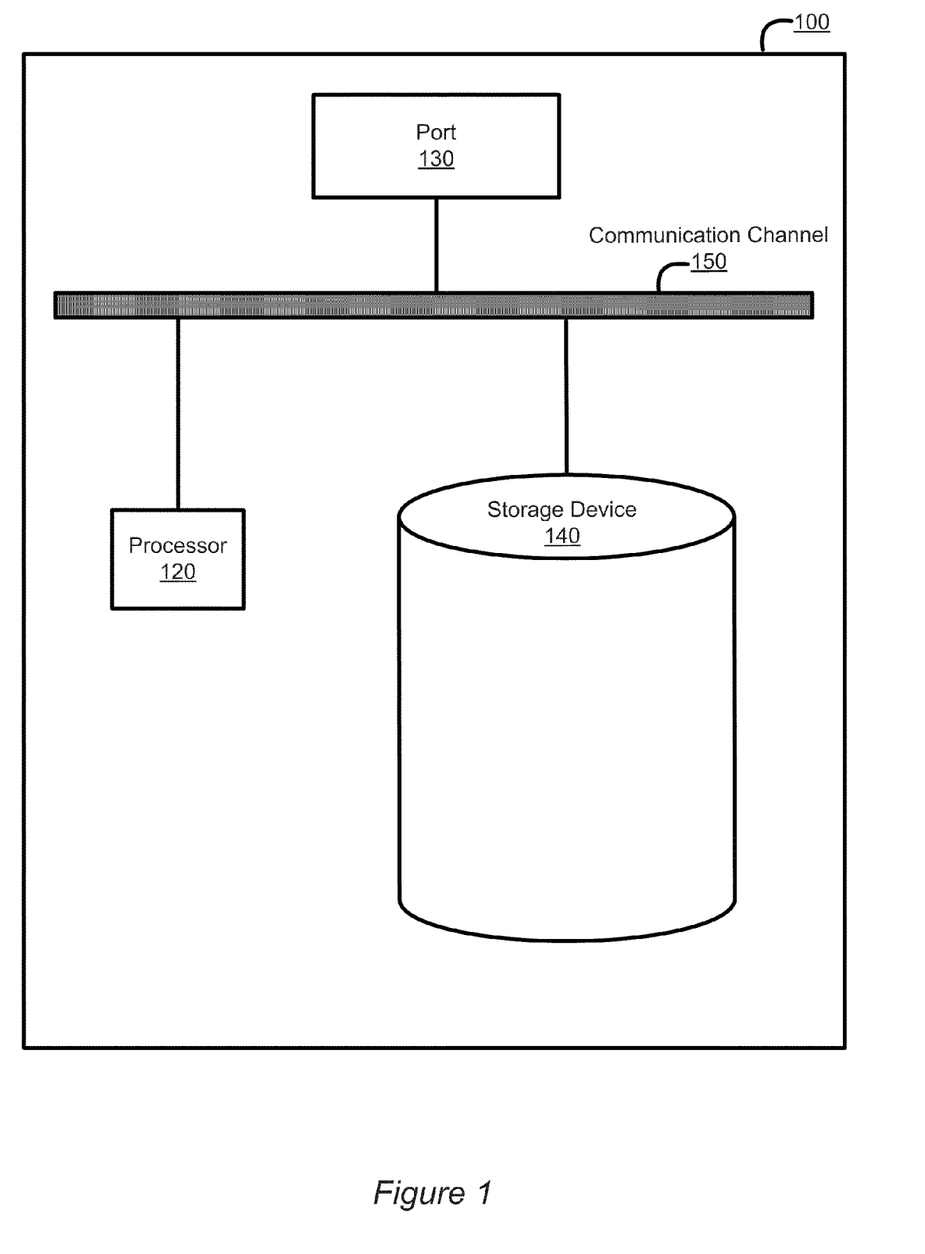
FIG. 1 illustrates a computing machine with one or more ports according to an embodiment of the invention.

FIG. 1 illustrates a computing machine 100 with one or more ports 130 according to an embodiment of the invention. In one embodiment, the computing machine 100 is a desktop, a laptop, a netbook, a server, and/or any computing device which can include one or more ports 130. As illustrated in FIG. 1, the device 100 includes a processor 120, one or more ports 130, a storage device 140, and a communication channel 150 for the computing machine 100 and/or one or more components of the computing machine 100 to communicate with one another. Additionally, in one embodiment, the storage device 140 includes a component application. In other embodiments, the computing machine 100 includes additional components and/or is coupled to additional components in addition to and/or in lieu of those noted above and illustrated in FIG. 1.

As noted above, the computing machine 100 includes a processor 120. The processor 120 sends data and/or instructions to the components of the computing machine 100, such as one or more of the ports 130 and the component application. Additionally, the processor 120 receives data and/or instruction from components of the computing machine 100, such as one or more of the ports 130 and the component application.

The component application is an application which can be used independently and/or in conjunction with the processor 120 to manage and/or configure one or more components of another computing machine for use by the computing machine 100. For the purposes of this application, another computing machine can include a desktop, a laptop, a server, a netbook, and/or any additional computing device which can couple to the computing machine 100. Additionally, a component of the other computing machine can include a processor, a memory, a storage device, a graphical device, a communication device, an input device, an output device, and/or a display device.

In response to detecting the other computing machine coupling to the computing machine 100, the processor 120 and/or the component application can initialize at least one component of the other computing machine. Additionally, one or more component drivers for at least one of the initialized components can be loaded onto the computing machine 100 by the processor 120 and/or the component application. For the purposes of this application, a component driver includes software and/or firmware which can be utilized by the processor 120 and/or the component application to manage, access, and/or control an initialized component. Once a component driver has been loaded, the processor 120 and/or the component application can configure the computing machine 100 to utilize the loaded component driver to manage and/or control at least one of the initialized components of the other computing machine.

The component application can be firmware which is embedded onto the computing machine 100 and/or the storage device 140. In another embodiment, the component application is a software application stored on the computing machine 100 within ROM or on the storage device 140 accessible by the computing machine 100. In other embodiments, the component application is stored on a computer readable medium readable and accessible by the computing machine 100 or the storage device 140 from a different location.

Additionally, in one embodiment, the storage device 140 is included in the computing machine 100. In other embodiments, the storage device 140 is not included in the computing machine 100, but is accessible to the computing machine 100 utilizing a network interface included in the computing machine 100. The network interface can be a wired or wireless network interface card. In other embodiments, the storage device 140 can be configured to couple to one or more ports or interfaces on the computing machine 100 wirelessly or through a wired connection. In a further embodiment, the component application is stored and/or accessed through a server coupled through a local area network or a wide area network. The component application communicates with devices and/or components coupled to the computing machine 100 physically or wirelessly through a communication bus 150 included in or attached to the device 100. In one embodiment the communication bus 150 is a memory bus. In other embodiments, the communication bus 150 is a data bus.

As noted above, the processor 120 and/or the component application can manage and/or configure one or more components of another computing machine for use by the computing machine 100. One or more of the ports 130 of the computing machine 100 can initially be accessed by the processor 120 and/or the component application to determine whether the other computing machine has coupled to a port 130 of the computing machine 100. A port 130 is a component of the computing machine 100 configured to couple, engage, and/or interface with the other computing machine.

Figure 2:
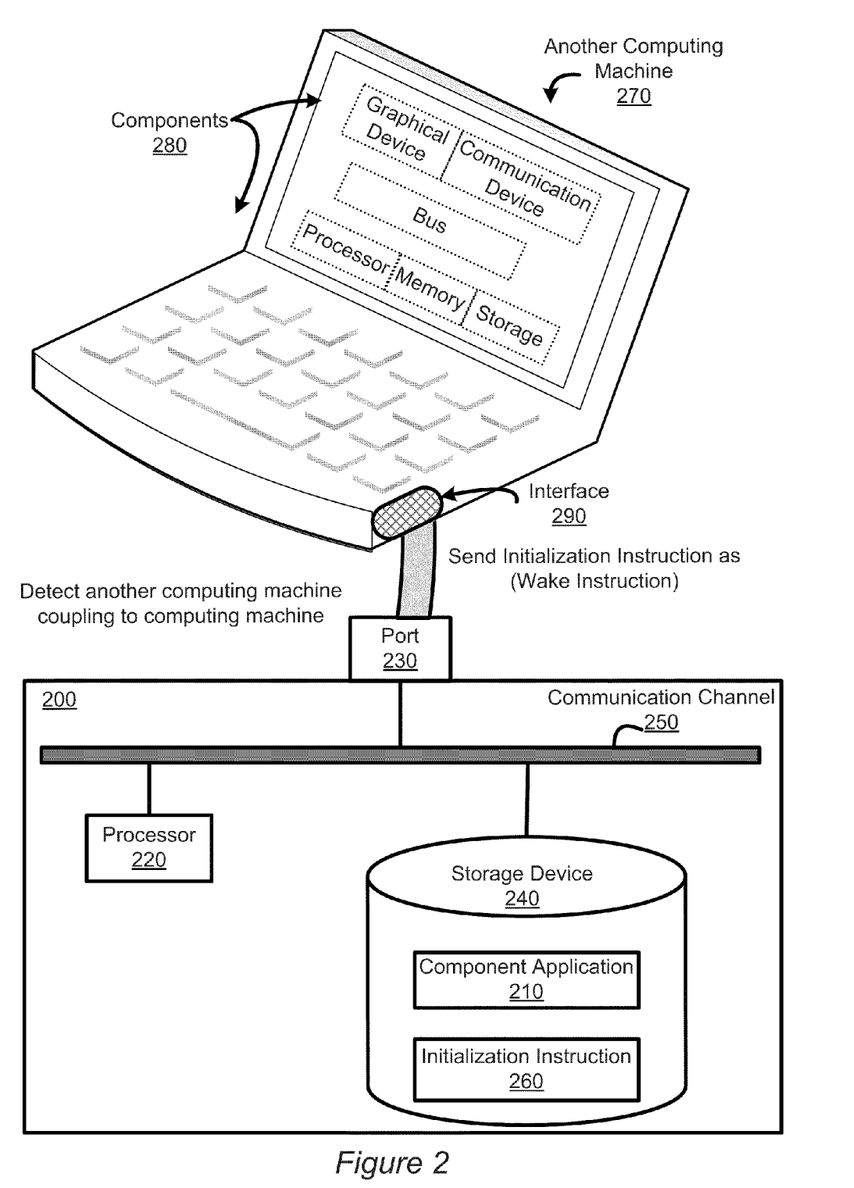
FIG. 2 illustrates a computing machine coupled to another computing machine with components according to an embodiment of the invention.

FIG. 2 illustrates a computing machine 200 coupled to another computing machine 270 with components according to an embodiment of the invention. As noted above and as shown in the present embodiment, a storage device 240 of the computing machine 200 can include a component application 210. The processor 220 and/or the component application 210 send an instruction for one or more ports 230 to engage, couple, and/or interface with the other computing machine 270.

One or more ports 230 can be coupled or mounted to one or more locations on the computing machine 200. In one embodiment, a port 230 can be a USB port, a serial device port, a SATA port, an ESATA port, a PCI port, a PCIE port, IDE port, a Firewire port and/or a port replicator. In another embodiment, a port 230 can include wireless components or devices configured to wirelessly couple and interface with the other computing machine 270. In other embodiments, a port 230 can include additional types of components of the computing machine 200 configured to couple and interface with the other computing machine 270 to the computing machine 200 in addition to and/or in lieu of those noted above.

As shown in the present embodiment, a port 230 of the computing machine 200 couples with the other computing machine 270 through an interface 290 of the other computing machine 270. As shown in FIG. 2, the port 230 can physically couple the computing machine 200 with the interface 290 of the other computing machine 270 with a cable. In one embodiment, the interface 290 can be a USB interface, a SATA interface, an ESATA interface, a PCI interface, a PCIE interface, an IDE interface, a Firewire interface, a serial interface and/or a port replicator interface.

In another embodiment, the port 230 and/or the interface 290 can include wireless components or devices configured to wirelessly couple and interface with one another when coupling the computing machine 200 to the other computing machine 270. In other embodiments, the computing machine 200 can couple and interface with the other computing machine 270 using additional methods and/or components in addition to and/or in lieu of those noted above and illustrated in FIG. 2.

When coupling and interfacing with the other computing machine 270, the processor 220 and/or the component application 210 can access one or more of the ports 230 through the communication bus 250 and detect one or more signals. A signal can be a digital and/or an analog signal generated by a port 230 when the port 230 detects the other computing machine 270 or an interface 290 of the other computing machine 270 coupling to the port 230. In another embodiment, one or more of the signals are generated by the other computing machine 270 or the interface 290 in response to coupling to the ports 230. In other embodiments, one or more of the ports 230 can include a switch which is configured to generate the signal in response to the other computing machine coupling to a port 230.

The processor 220 and/or the component application 210 can periodically, continuously, and/or upon request detect and/or scan a port 230 for one or more of the signals. In response to detecting a signal, the processor 220 and/or the component application 210 will determine that the other computing machine 270 has couple to the computing machine 200. As illustrated in FIG. 2, the processor 220 and/or the component application 210 will then proceed to send an initialization instruction 260 through the port 230 to the other computing machine 270. The initialization instruction 260 is an executable command configured to instruct the other computing machine 270 to power on and initialize one or more components 280 included in the other computing machine 270.

In one embodiment, the initialization instruction 260 is a wake-on instruction configured to prompt the other computing machine 270 to power on and/or resume from a sleep state or low power state. In response to receiving the initialization instruction 260, the other computing machine 270 proceeds to initialize the components 280 of the other computing machine 270. As illustrated in FIG. 2, a component 280 of the other computing machine 270 can include a processor, a memory, a storage device, a graphical device, a communication device, an input device, an output device, and/or a display device. In other embodiments, a component 280 can include one or more additional devices or components of the other computing machine 270 configured to initialize and communicate with the computing machine 200 in response to the other computing machine 270 coupling to the computing machine 200.

Figure 3:
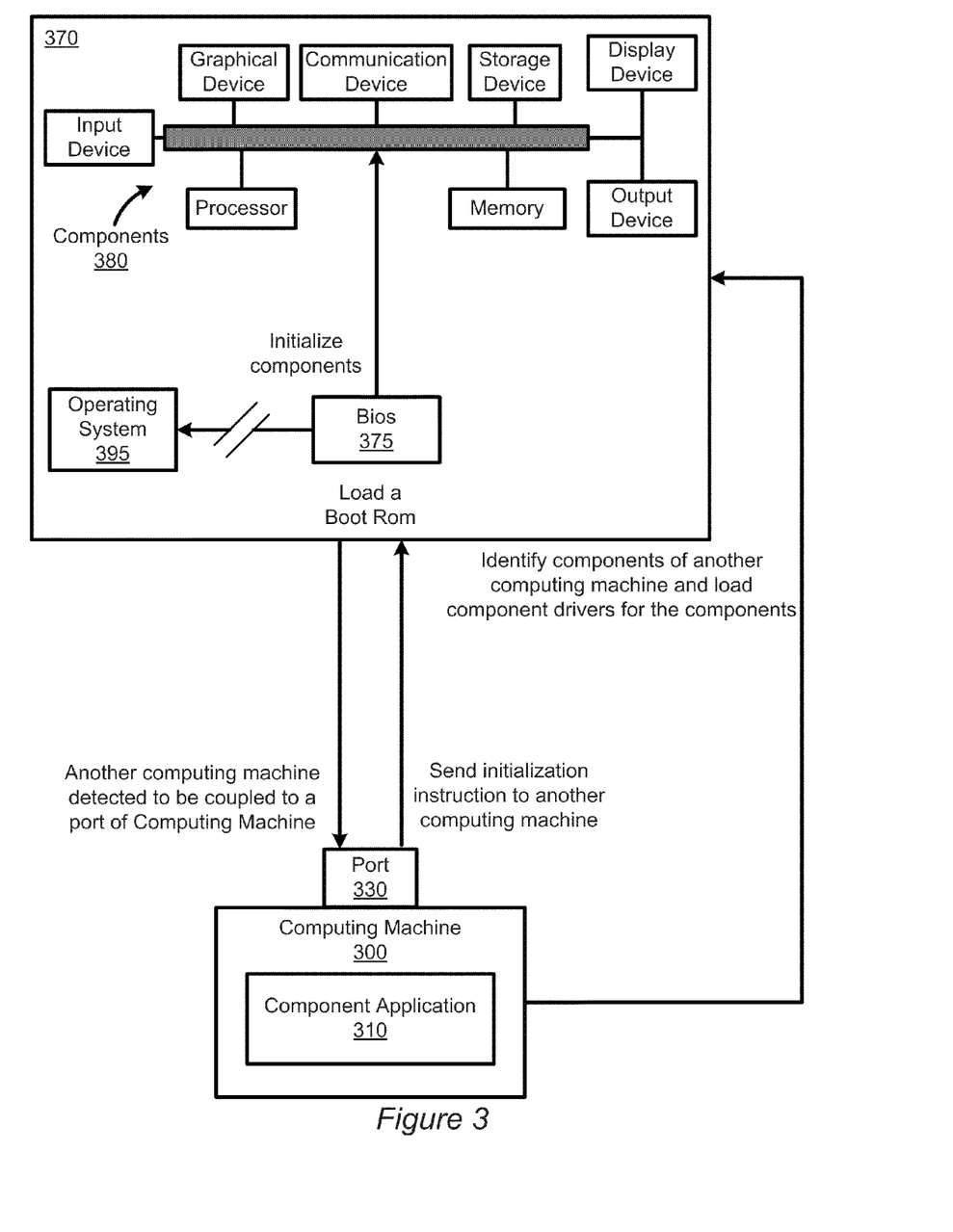
FIG. 3 illustrates a block diagram of a component application configuring a computing machine to utilize components of another computing machine according to an embodiment of the invention.

FIG. 3 illustrates a block diagram of a component application 310 configuring a computing machine 300 to utilize components 380 of another computing machine 370 according to an embodiment of the invention. As illustrated in the present embodiment, in response to a port 330 of the computing machine 300 detecting the other computing machine 370 coupling to the port 330, the port 330 generates a signal and prompts the component application 310 that the other computing machine 370 is detected. Additionally, the component application 310 sends an initialization instruction to the other computing machine 370 through the port 330.

In one embodiment, before sending the initialization instruction, the component application 310 can attempt to authenticate the other computing machine 370. When authenticating the other computing machine 370, the component application 310 prompts the other computing machine 370 to identify itself. The component application 310 can then compare the identity of the other computing machine 370 to an approved list determine if the other computing machine 370 is approved to couple to it.

In another embodiment, the component application 310 can search the other computing machine 370 for a key or hardware/software token which can unlock an encryption on the computing machine 300. In other embodiments, the component application 310 can authenticate the other computing machine 370 using additional methods and/or devices in addition to and/or in lieu of those noted above.

As illustrated in FIG. 3, in response to receiving the initialization instruction, the other computing machine 370 proceeds to load a Boot Rom 375 for use on the other computing machine 370. The Boot Rom 375 can include software and/or code configured to initialize the other computing machine 370 and one or more components 380 of the other computing machine 370. The Boot Rom 375 can be executed by a processor of the other computing machine 370. In one embodiment, as illustrated in FIG. 3, the Boot Rom 375 can be a BIOS 375 of the other computing machine 370.

When initializing the other computing machine 370 and one or more of the components 380, the other computing machine 370 can provide power to one or more of the components 380. Additionally, the BIOS 375 can send instructions for one or more of the components 380 to communicate with the computing machine 300 through the port 330 of the computing machine 300. In one embodiment, as illustrated in FIG. 3, while the BIOS 375 is operating and initializing one or more of the components 380, an operating system 395 of the other computing machine 370 is not configured for use.

Additionally, as illustrated in FIG. 3, in response to sending the initialization instruction, the component application 310 will detect one or more initialized components 380 available on the other computing machine 370. As shown in the present embodiment, when detecting one or more initialized components 380, the component application 310 can access a communication channel or bus of the other computing machine 370 and proceed to detect and/or scan for one or more initialized components 380 coupled to the communication channel or bus. In another embodiment, when detecting an initialized component 380 of the other computing machine 370, the component application 310 can prompt the initialized components 380 to identify themselves. In other embodiments, the component application 310 can access and read one or more header files of the initialized components 380 when identifying the initialized components 380.

In one embodiment, once the component application 310 has detected one or more initialized components 380 of the other computing machine 370, the component application 310 can identify a make and/or model of the initialized components 380. When identifying a make and/or model of an initialized component 380, the component application 310 can access one or more files or headers of the component 380 for a listed make and/or model. In another embodiment, the component application 310 can prompt the initialized components 380 to identify themselves. In response to identifying the initialized components 380, the component application 310 will proceed to load at least one component driver for the initialized components 380.

As noted above, a component driver includes software and/or firmware which can be utilized by the component application 310 to manage, access, and/or control one or more of the initialized components 380. One or more component drivers can be stored on the computing machine 300, the other computing machine 370, and/or on another location accessible to the component application 310. In one embodiment, the component application 310 will load a component driver for each initialized component 380 of the other computing machine 370. In another embodiment, the component application 310 can load a package of component drivers for one or more of the initialized components 380.

In one embodiment, when loading at least one component driver for the initialized components, the component application 310 will interface with a storage device of the other computing machine 370 and proceed to scan the storage device for one or more component drivers. In another embodiment, the component application 310 can scan one or more devices of the computing machine 300 and/or access another device stored on another location. In response to loading at least one component driver, the component application 310 will proceed to configure the computing machine 300 to utilize at least one of the loaded component drivers when managing or controlling one or more of the initialized components 380.

Figure 4:
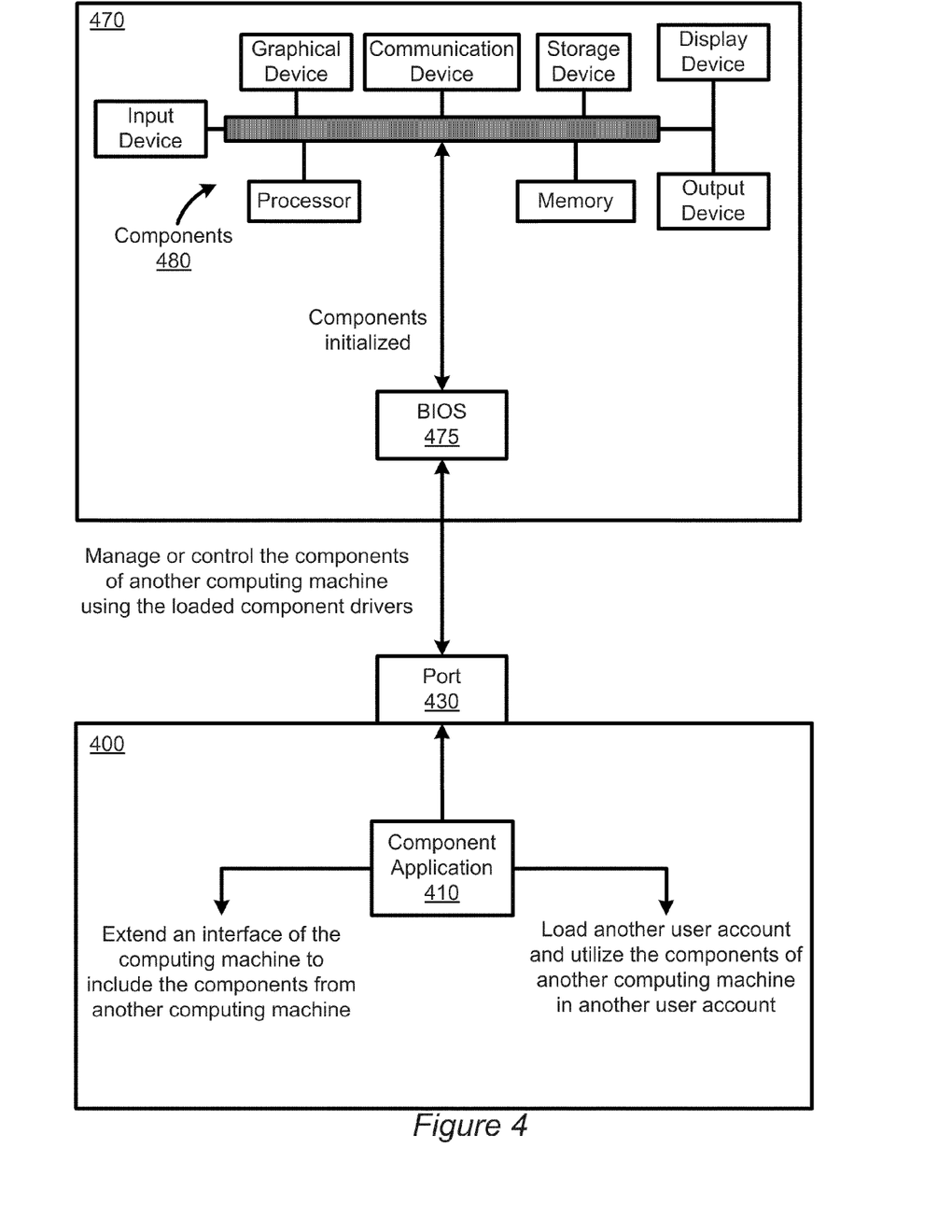
FIG. 4 illustrates a block diagram of a component application configuring a computing machine to utilize components of another computing machine according to another embodiment of the invention.

FIG. 4 illustrates a block diagram of a component application 410 configuring a computing machine 400 to utilize components 480 of another computing machine 470 according to another embodiment of the invention. As illustrated in FIG. 4, in response to one or more of the components 480 of the other computing machine 470 being initialized, a Boot Rom (BIOS 475) of the other computing machine 470 notifies the computing machine 400 and the component application 410 proceeds to configure the computing machine 400 to control the components 480 of the other computing machine 470 using the loaded component drivers.

The loaded component drivers are loaded onto the computing machine 400 and identify the components 480 of the other computing machine 470 as components and/or devices which are coupled to the computing machine 400 through the port 430 of the computing machine 400. As a result, the computing machine 400 recognizes the initialized components 480 of the other computing machine 470 as devices and/or components which are directly coupled to the computing machine 400 and are available for use.

Additionally, when communicating with one or more of the components 480, the component application 410 will send instructions using a corresponding component driver to the port 430. In response, the port 430 will transfer and/or transmit the instruction to the BIOS 475 of the other computing machine 470. The BIOS 475 will then identify which of the components 480 the instruction is identified to have the instruction executed on it and proceed to direct the instructions to the corresponding component 480.

Additionally, the components 480 of the other computing machine 470 can be utilized by the computing machine 400 in one or more user accounts of the computing machine 400. In one embodiment, the component application 410 can load and/or configure a first user account to, utilize the components of the computing machine 400 and one or more initialized components 480 of the other computing machine 470 using the loaded component drivers corresponding to the initialized components 480. A user account is a configured mode of operation of the computing machine 400 which is loaded for one or more users. When the initialized components 480 of the other computing machine 470 are utilized in conjunction with components of the computing machine 400, the component application 410 extends an interface of the user account to include the components 480 of the other computing machine 470.

In another embodiment, the component application 410 loads a second user account for use on the computing machine 400. A second user account can be configured by the component application 410 to utilize one or more of the initialized components 480 from the other computing machine 470. Additionally, the component application 410 can further configure the second user account to not utilize one or more of the components of the computing machine 400. As a result, an interface can be created for a first user account, where the first user account uses components of the computing machine 400. Additionally, an interface for a second user account can be created to use initialized components 480 of the other computing machine 470.

In other embodiments, the component application 410 can configure a first user account and a second user account to both utilize components from the computing machine 400 and the other computing machine 470. In other embodiments, a processor of the computing machine 400 can be utilized independently and/or in conjunction with the component application to perform one or more of the steps noted above.

Figure 5:
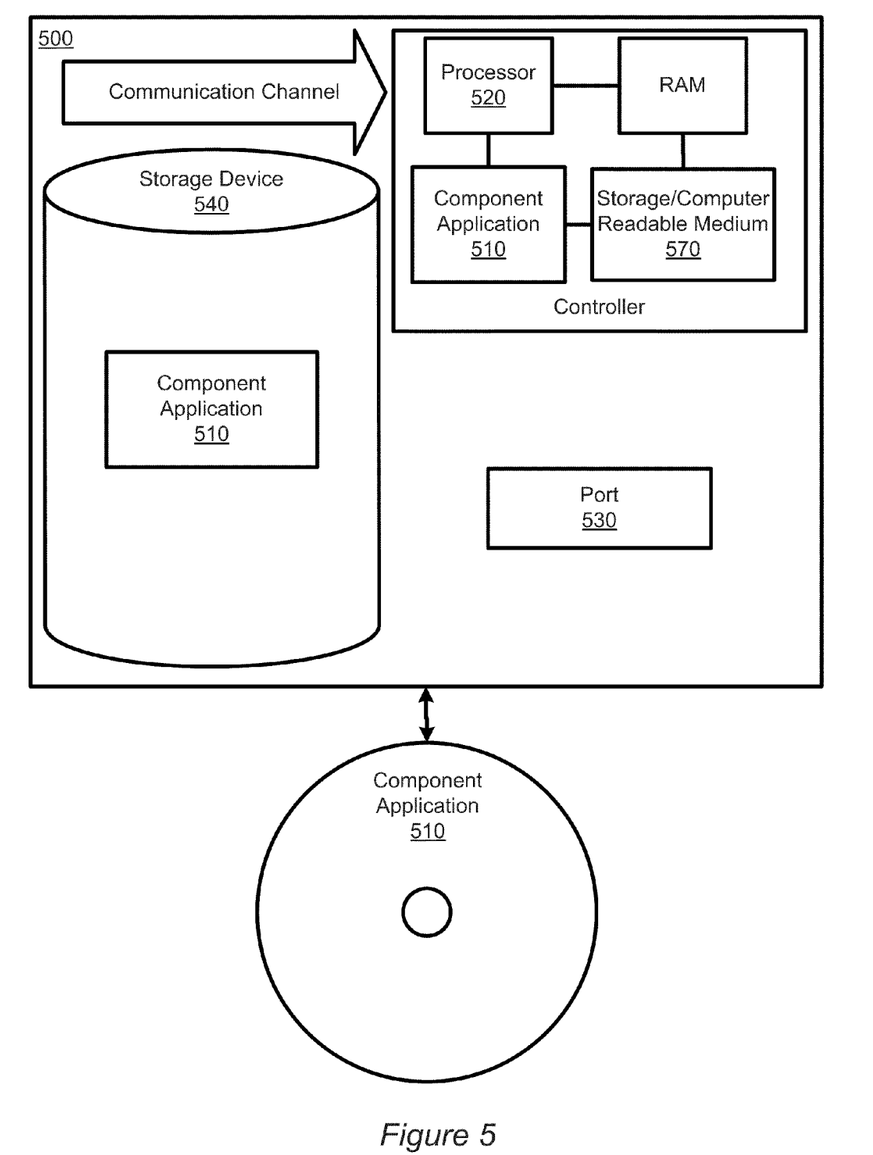
FIG. 5 illustrates a computing machine with a component application and a component application stored on a removable medium being accessed by the computing machine according to an embodiment of the invention.

FIG. 5 illustrates a computing machine 500 with an component application 510 and a component application 510 stored on a removable medium being accessed by the computing machine 500 according to an embodiment of the invention. For the purposes of this description, a removable medium is any tangible apparatus that contains, stores, communicates, or transports the application for use by or in connection with the computing machine 500. As noted above, in one embodiment, the component application 510 is firmware that is embedded into one or more components of the component application 500 as ROM. In other embodiments, the component application 510 is a software application which is stored and accessed from a hard drive, a compact disc, a flash disk, a network drive or any other form of computer readable medium that is coupled to the computing machine 500.

Figure 6:
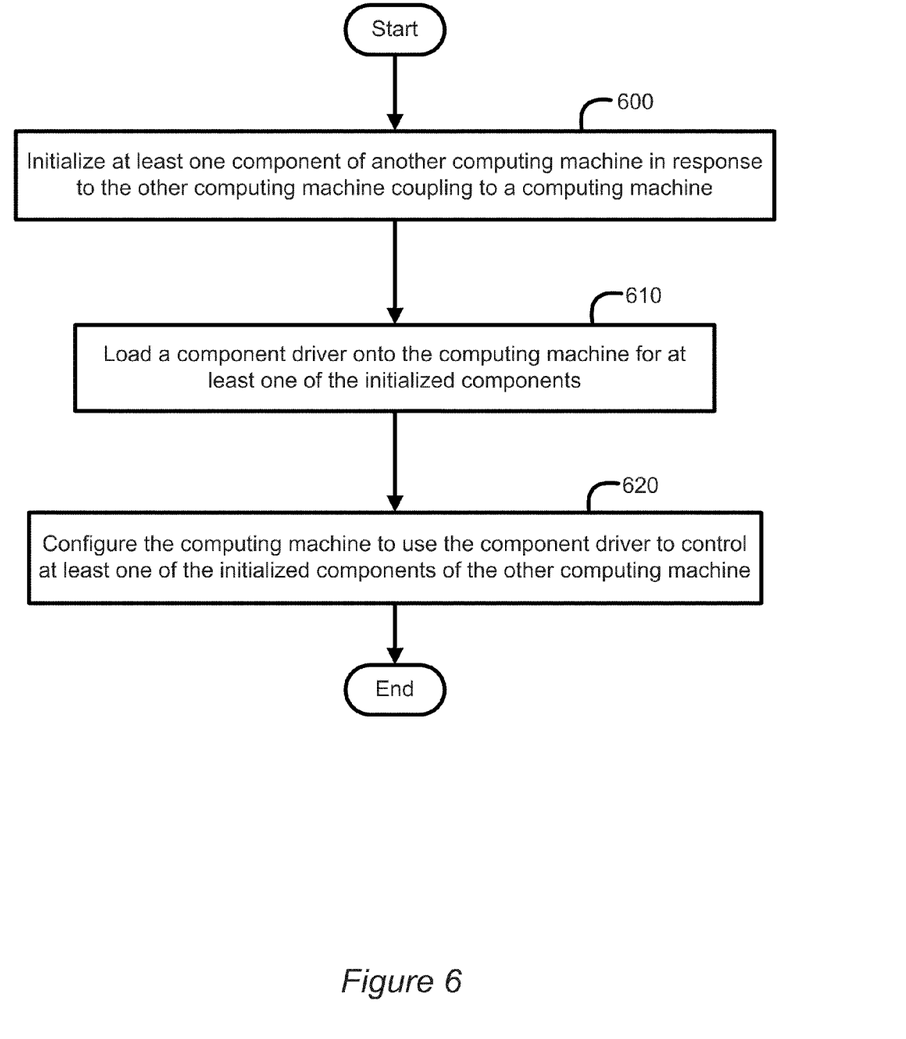
FIG. 6 is a flow chart illustrating a method for managing components of another computing machine according to an embodiment of the invention.

FIG. 6 is a flow chart illustrating a method for managing components of another computing machine according to an embodiment of the invention. The method of FIG. 6 uses a computing machine with a processor, at least one port, a communication channel, a storage device, and a component application. In other embodiments, the method of FIG. 6 uses additional components and/or devices in addition to and/or in lieu of those noted above and illustrated in FIGS. 1, 2, 3, 4, and 5.

As noted above, the processor can independently or in conjunction with the component application manage one or more components of the other computing machine in response to the other computing machine coupling to the computing machine. A component of the other computing machine can include a processor, a memory, a storage device, a graphical device, a communication device, an input device, an output device, and/or a display device. In other embodiments, a component can include additional devices or components coupled to another computing machine which can be accessed by the processor and/or the component application in response to the other computing machine coupling to the computing machine.

When managing one or more of the components, the processor and/or the component application can access one or more ports of the computing machine to determine whether the other computing machine has coupled to a port. As noted above, a port is a component of the computing machine configured to couple, engage, and/or interface with the other computing machine. When accessing one or more of the ports, the processor and/or the component application can detect or scan for any signal generated by one or more of the ports the communication bus of the computing machine.

As noted above, one or more of the signals can be digital and/or analog signals generated by a port or the other computing machine when the other computing machine couples to the port. In response to detecting a signal from a port, the processor and/or the component application will determine that the other computing machine has coupled to the computing machine and proceed to initialize at least one component of the other computing machine 600.

As noted above, the processor and/or the component application will send an initialization instruction through the corresponding port where the other computing machine is coupled. The initialization instruction is an executable command configured to instruct the other computing machine to power on and initialize one or more components included in the other computing machine. In one embodiment, the initialization instruction is a wake on command.

Additionally, in response to receiving the initialization instruction from the computing machine, the other computing machine will proceed to load a Boot Rom for use. In one embodiment, the Boot Rom can include a BIOS of the other computing machine. Additionally, the Boot Rom will proceed to configure one or more components of the other computing machine for use and instruct the components to communicate with the computing machine through the coupling port.

Further, in response to sending the initialization instruction to the other computing machine, the processor and/or the component application will proceed to detect and/or identify one or more components of the other computing machine and load at least one component driver for one or more of the initialized components of another computing machine 610. In one embodiment, when identifying one or more of the components, the processor and/or the component application will send an instruction through the port for the components to identify themselves. In another embodiment, one or more files, such as a header file, can be accessed and utilized by the processor and/or the component application to identify a component. In other embodiments, a communication channel or bus of the other computing machine can directly be accessed by the processor and/or the component application to identify components coupled to the communication channel or bus.

Once the components of the other computing machine have been identified, at least one component driver can be loaded onto the computing machine to control and/or utilize one or more of the components of another computing machine. A component driver includes software and/or firmware utilized by the processor and/or the component application to access, manage, and/or control one or more of the components. Additionally, one or more of the component drives can be loaded individually for each corresponding component or loaded as a packet.

Utilizing one or more of the loaded component driver, the computing machine can be configured to control one or more of the initialized components of the other computing machine 620. Using the loaded component drivers, the processor and/or the component will interface with the other computing machine through the port and proceed to communicate with the components through the port. Additionally, the loaded component drivers to render the initialized component of the other computing machine as devices or components coupled to the computing machine.

As a result, the computing machine recognizes the initialized components of the other computing machine as devices and/or components which are directly coupled to the computing machine and are available for use. Using the loaded component drivers, the initialized components of the other computing machine can be used and shared as part of a first user account of the computing machine or the initialized components can be used as part of a second user account, while the first user account uses components of the computing machine. In other embodiments, the method of FIG. 6 includes additional steps in addition to and/or in lieu of those depicted in FIG. 6.

Figure 7:
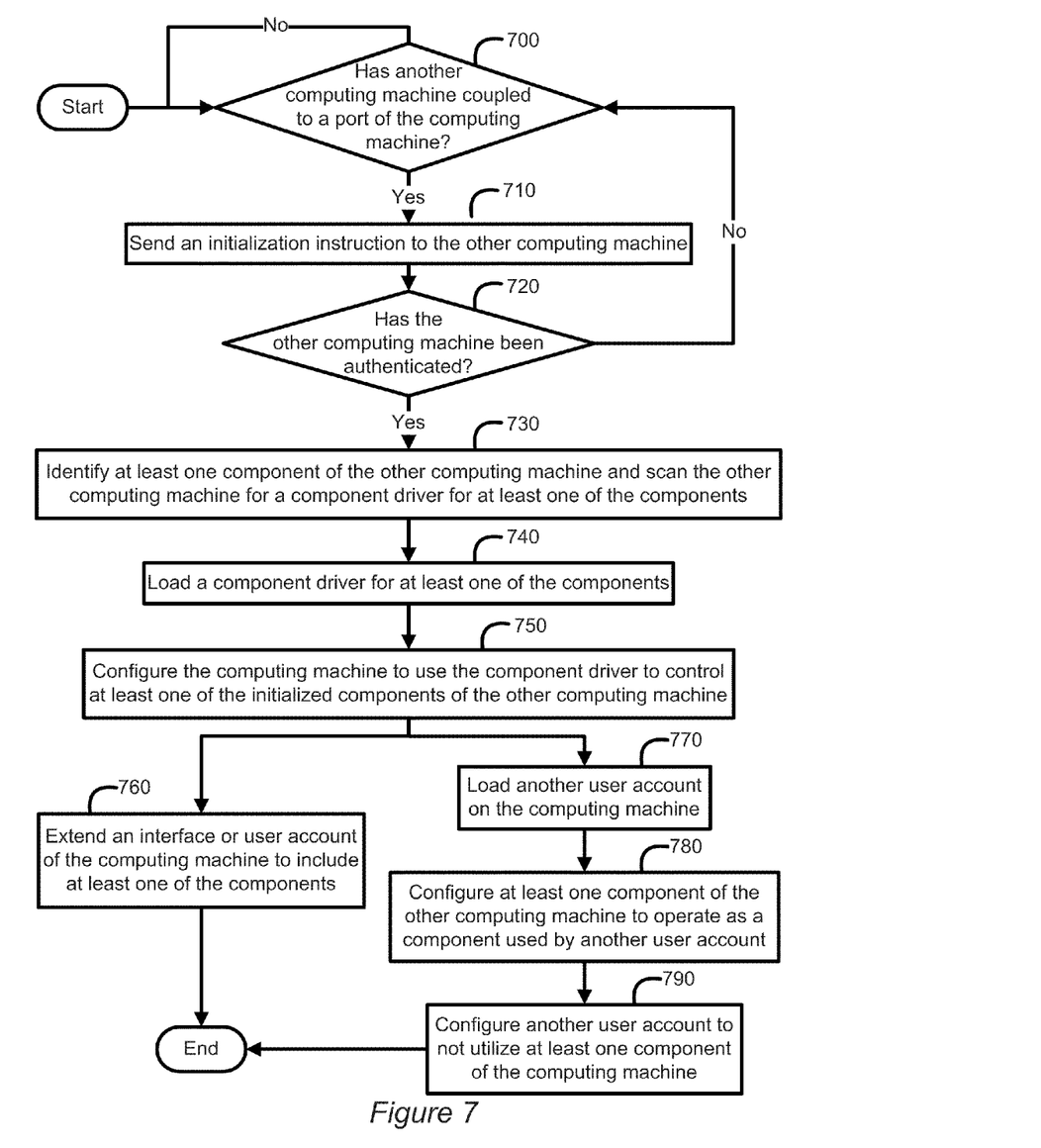
FIG. 7 is a flow chart illustrating a method for managing components of another computing machine according to another embodiment of the invention.

FIG. 7 is a flow chart illustrating a method for managing components of another computing machine according to an embodiment of the invention. Similar to the method of FIG. 6, the method of FIG. 7 uses a computing machine with a processor, at least one port, a communication channel, a storage device, and a component application. In other embodiments, the method of FIG. 7 uses additional components and/or devices in addition to and/or in lieu of those noted above and illustrated in FIGS. 1, 2, 3, 4, and 5.

As noted above, the processor and/or the component application can initially instruct one or more ports to detect the other computing machine coupling to the computing machine 700. The processor and/or the component application access a communication channel or bus coupled to a port and detect or scan for a signal generated by the port or the other computing machine. If no signal is detected, the processor and/or the component application continue to monitor and/or poll the port to determine whether the other computing machine has coupled to the computing machine 700.

In response to detecting one or more signals from the port or another computing machine, the processor and/or the component application will be notified that the other computing machine has coupled to the port. An initialization instruction will then be sent to the other computing machine through the coupling port 710. In one embodiment, the other computing machine can be in a powered off state or a low power state and the initialization instruction can be a wake on instruction. In response to receiving the initialization instruction, the other computing machine will proceed to load a Boot Rom for the other computing machine.

In one embodiment, loading the Boot Rom includes entering and/or transitioning into another mode of operation on the other computing machine. Additionally, the Boot Rom can instruct one or more of the components of the other computing machine to power on and communicate with the computing machine through the port. In one embodiment, the Boot Rom further sends a key or encryption through the port for the computing machine to authenticate.

In response to receiving the key or encryption of the other computing machine, the processor and/or the component application will proceed to authenticate the other computing machine by comparing and/or unlocking the key or encryption using a sequence of characters, numbers, algorithms, and/or software/hardware tokens. If the other computing machine is not authenticate, the processor and/or the component application will proceed to instruct one or more of the ports of the computing machine to detect for the other computing machine coupling to the computing machine 700.

If the other computing machine is successfully authenticated, the processor and/or the component application proceed to identify one or more components of the other computing machine and scan the other computing machine for at least one component driver which can be utilized to access, control, and/or manage the components 730. In one embodiment, the Boot Rom can identify one or more of the components. In another embodiment, one or more files or headers can be read to identify the components.

Additionally, as noted above, at least one component driver can be stored on a storage device of another computing machine. The processor and/or the component application can access the storage device of the other computing machine and scan for at least one component driver which can be utilized. In another embodiment, a storage device of the computing machine or from another location can be searched for at least one component driver to load.

In response to location at least one component driver, the processor and/or the component application will proceed to load at least one of the component drivers to control, access, and/or manage one or more of the initialized components 740. As noted above, the loaded component drivers render the initialized components of another computing machine as one or more components which are directly coupled to the computing machine and are available for use.

The processor and/or the component application will proceed to configure the computing machine to use the loaded component drivers to control one or more of the initialized components of the other computing machine 750. In one embodiment, the initialized components can be used as part of first user account. Further, an interface of the first user account can be extended so that the first user account can use components of the computing machine and the initialized components of the other computing machine 760.

In another embodiment, the processor and/or the component application can launch a second user account of the computing machine. The processor and/or the component application can then configure at least one initialized component of the other computing machine to operate as a component used in the second user account 780. While the second user account uses the initialized components of the other computing machine, the processor and/or the component application configure the first user account to use the components of the computing machine. In one embodiment, processor and/or the component application additionally configure the second user account to not utilize one or more components of the computing machine. In other embodiments, the method of FIG. 7 includes additional steps in addition to and/or in lieu of those depicted in FIG. 7.

What is claimed is:

1. A method comprising:
    initializing at least one hardware component of an other computing machine via a Basic Input/Output System (BIOS) of the other computing machine in response to the other computing machine coupling to a computing machine;
    loading a component driver onto the computing machine for at least one of the initialized hardware components; and
    configuring the computing machine to use the component driver to directly control at least one of the initialized hardware components of the other computing machine.

2. The method of claim 1 further comprising detecting the other computing machine coupling to the computing machine through a port of the computing machine.

3. The method of claim 2 further comprising sending an initialization instruction to the other computing machine in response to detecting the other computing machine coupling to a port of the computing machine.

4. The method of claim 3 wherein the other computing machine launches a Boot Rom to initialize at least one of the hardware components in response to receiving the initialization instruction from the computing machine.

5. The method of claim 1 further comprising scanning the other computing machine for at least one of the drivers to load and use on the computing machine.

6. The method of claim 1 further comprising loading a first user account and a second user account on the computing machine.

7. The method of claim 6 wherein the second user account utilizes at least one of the initialized components of the other computing machine.

8. The method of claim 6 wherein the second user account does not utilize at least one hardware component of the computing machine.

9. A computing machine comprising:
    a port configured to couple with an interface of an other computing machine; and
    a processor to identify at least one hardware component of the other computing machine in response to at least one of the hardware components being initialized and to load a component driver onto the computing machine to directly control at least one of the initialized hardware components of the other computing machine.

10. The computing machine of claim 9 further comprising a communication bus coupled to the port and configured to allow the computing machine to interface and communicate with the other computing machine.

11. The computing machine of claim 9 wherein the port includes at least one from the group consisting of a USB port, a Sata port, a ESATA port, a PCI port, a PCIE port, a firewire port, and a port replicator.

12. The computing machine of claim 9 wherein an initialization instruction is sent to the other computing machine through the port when initializing at least one of the hardware components of the other computing machine.

13. The computing machine of claim 12 wherein the initialization instruction is a wake-on instruction.

14. The computing machine of claim 12 wherein the other computing machine loads a BIOS to operate as a Boot Rom for the other computing machine in response to receiving the initialization instruction.

15. The computing machine of claim 9 wherein an operating system of the other computing machine is not loaded while at least one of the hardware components is being used by the computing machine.

16. The computing machine of claim 9 where a hardware component of the other computing machine includes at least one from the group consisting of a processor, a memory, a storage device, a communication device, a graphical device, a display device, an input device, and an output device of another computing machine.

17. A computer-readable program in a non-transitory computer-readable medium comprising:
 a component application configured to send an initialization instruction to an other computing machine in response to detecting the other computing machine coupling to a port of a computing machine;
 wherein the component application is additionally configured to identify at least one hardware component of the other computing machine and load a component driver for at least one of the hardware components on the computing machine; and
 wherein the component application further configures the computing machine to use at least one of the hardware components as a component of the computing machine.

18. The computer-readable program in the non-transitory computer-readable medium of claim 17 wherein the component application is additionally configured to authenticate the other computing machine before loading a component driver and configuring the computing machine to use at least one of the hardware components of the other computing machine.

19. The computer-readable program in the non-transitory computer-readable medium of claim 17 wherein the component application is further configured to extend an interface of the computing machine to include at least one of the components of the other computing machine.

20. The computer-readable program in the non-transitory computer-readable medium of claim 17 wherein the component application additionally configures at least one of the hardware components of the other computing machine to operate as components utilized by another user account on the computing machine.

* * * * *